United States Patent
Felix et al.

(10) Patent No.: US 11,236,985 B2
(45) Date of Patent: Feb. 1, 2022

(54) SYSTEMS AND METHODS FOR CYCLIC ERROR CORRECTION IN A HETERODYNE INTERFEROMETER

(71) Applicant: Keysight Technologies, Inc., Santa Rosa, CA (US)

(72) Inventors: Greg C. Felix, San Jose, CA (US); William Clay Schluchter, Los Altos, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 17/160,541

(22) Filed: Jan. 28, 2021

(65) Prior Publication Data

US 2021/0148691 A1 May 20, 2021

Related U.S. Application Data

(63) Continuation of application No. 16/130,517, filed on Sep. 13, 2018, now abandoned.

(60) Provisional application No. 62/571,486, filed on Oct. 12, 2017.

(51) Int. Cl.
*G01B 9/02* (2006.01)

(52) U.S. Cl.
CPC ..... *G01B 9/02059* (2013.01); *G01B 9/02007* (2013.01); *G01B 9/02019* (2013.01)

(58) Field of Classification Search
CPC ............ G01B 9/02007; G01B 9/02017; G01B 9/02018; G01B 9/02019; G01B 9/02059
See application file for complete search history.

(56) References Cited

U.S. PATENT DOCUMENTS

| | | | |
|---|---|---|---|
| 6,163,379 A | 12/2000 | de Groot | |
| 9,857,512 B1 | 1/2018 | Schluchter | |
| 2003/0038947 A1 | 2/2003 | Hill | |
| 2003/0095265 A1 | 5/2003 | Hill | |
| 2003/0197870 A1* | 10/2003 | Bagwell | G01B 9/02018 356/493 |
| 2003/0227344 A1 | 12/2003 | Kovac et al. | |
| 2005/0264823 A1 | 12/2005 | Zhu et al. | |

(Continued)

OTHER PUBLICATIONS

Hou, W.M. et al. "Eliminate of the Nonlinearity in Heterodyne Interferometer". Key Engineering Materials, vols. 381-382, Jun. 12, 2008, pp. 255-258.

(Continued)

*Primary Examiner* — Michael A Lyons

(57) ABSTRACT

A heterodyne optical interferometer incorporates error correction elements to correct a cyclic error that may be present in an interferometric measurement. The cyclic error can be caused by various factors such as an imperfect polarization relationship between two wavelength components, deficiencies in optical propagation paths (such as light leakage), imperfect optical coatings, and/or imperfect components. The cyclic error, which typically manifests itself as erroneous displacement information characterized by a low velocity sinusoidal frequency component, can be reduced or eliminated by using birefringent optical elements and other optical elements to alter certain characteristics of one or both wavelength components and reduce light leakage components in one or more light propagation paths in the heterodyne optical interferometer.

18 Claims, 8 Drawing Sheets

(56) References Cited

U.S. PATENT DOCUMENTS

| | | |
|---|---|---|
| 2007/0035742 A1 | 2/2007 | Hill |
| 2007/0171426 A1 | 7/2007 | Schluchter et al. |
| 2008/0304077 A1 | 12/2008 | Demarest |
| 2009/0109442 A1* | 4/2009 | Felix .................. G01B 9/02018 356/491 |
| 2009/0135430 A1 | 5/2009 | Zhu |

OTHER PUBLICATIONS

McRae, Terry G. et al. "Linearization and minimization of cyclic error with heterodyne laser interferometry". Optics Letters, vol. 37, No. 13, pp. 2448-2450, Jul. 1, 2012.

* cited by examiner

SYSTEMS AND METHODS FOR CYCLIC ERROR CORRECTION IN A HETERODYNE INTERFEROMETER

CROSS-REFERENCE TO RELATED APPLICATIONS

The present application is a continuation of, and claims priority under 35 U.S.C. § 120 from U.S. patent application Ser. No. 16/130,517 filed on Sep. 13, 2018 (allowed). This present application also claims priority under 35 U.S.C. § 119(e) from U.S. Provisional Application 62/571,486 filed on Oct. 12, 2017. The entire disclosures of U.S. patent application Ser. No. 16/130,517 and U.S. Provisional Application 62/571,486 are specifically incorporated herein by reference.

BACKGROUND

Interferometers are widely used for measuring displacement characteristics of various types of moving objects. A typical heterodyne interferometer generates an optical interference pattern by using a reference light beam and a measurement light beam. The measurement light beam includes a Doppler component that represents certain displacement characteristics of a moving object. The optical interference pattern is processed by the heterodyne interferometer to interpret the Doppler component and derive displacement information of the moving object. Unfortunately, various non-ideal characteristics of a typical heterodyne interferometer can lead to a cyclic error being introduced into the optical interference pattern, thereby causing ambiguities in interpreting the optical interference pattern and obtaining accurate displacement information of the moving object.

The cyclic error, which has a low frequency sinusoidal characteristic when the displacement is a slow displacement, is traditionally identified and addressed by using electronic circuitry to execute operations such as signal averaging and digital filtering. However, these operations can be quite time consuming as a result of the amount of time required by the electronic circuitry to detect and process the large wavelengths associated with the low frequency sinusoidal signal components. The consequent delay in obtaining displacement information of the target object can be unacceptable in at least some situations and it is therefore desirable to provide solutions that can minimize or eliminate this delay.

BRIEF DESCRIPTION OF THE FIGURES

Many aspects of the invention can be better understood by referring to the following description in conjunction with the accompanying claims and figures. Like numerals indicate like structural elements and features in the various figures. For clarity, not every element may be labeled with numerals in every figure. The drawings are not necessarily drawn to scale; emphasis instead being placed upon illustrating the principles of the invention. The drawings should not be interpreted as limiting the scope of the invention to the example embodiments shown herein.

DETAILED DESCRIPTION

Figure 1:
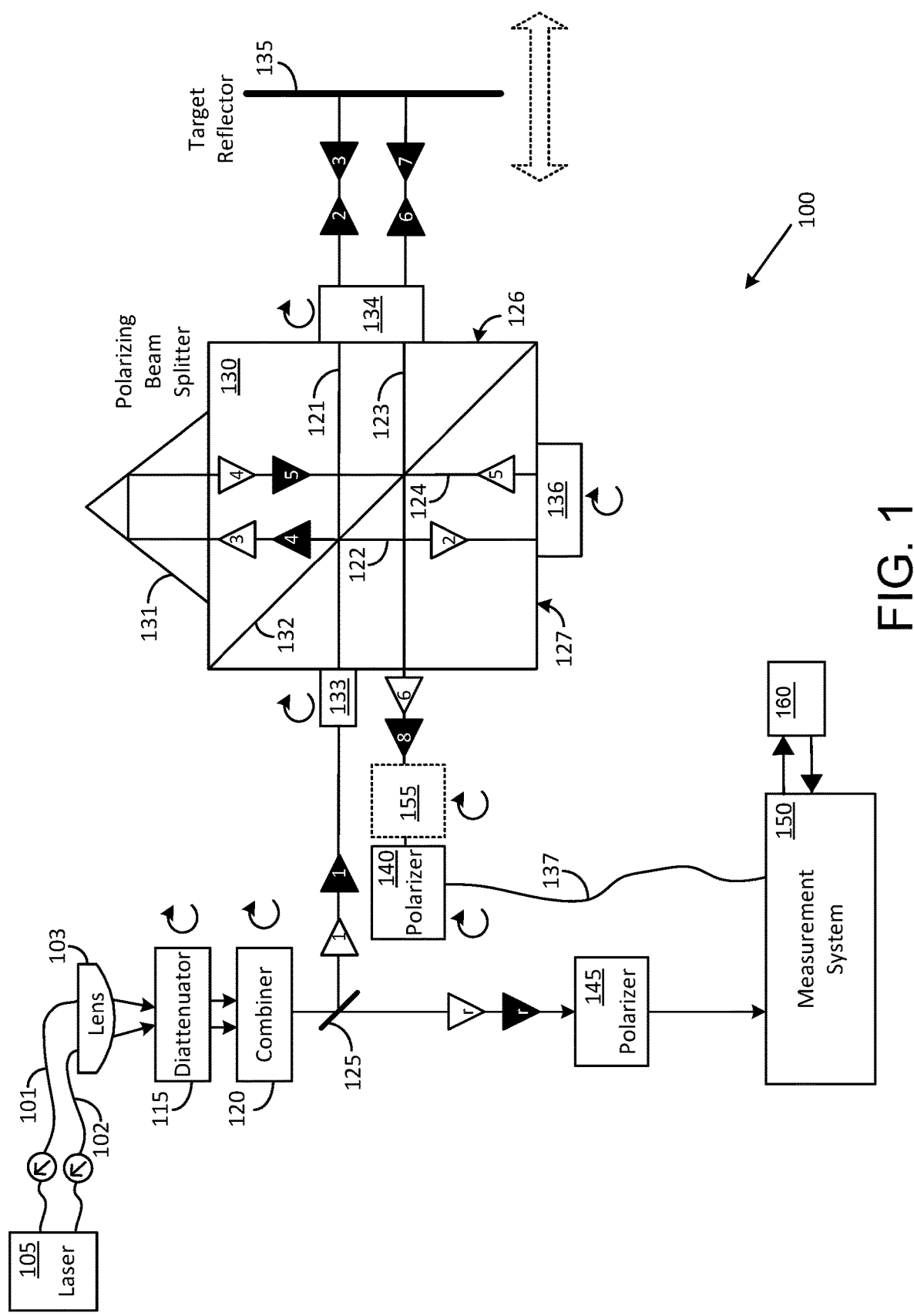
FIG. 1 shows an exemplary embodiment of a heterodyne optical interferometer incorporating cyclic error correcting elements in accordance with the disclosure.

Throughout this description, embodiments and variations are described for the purpose of illustrating uses and implementations of inventive concepts. The illustrative description should be understood as presenting examples of inventive concepts, rather than as limiting the scope of the concepts as disclosed herein. Towards this end, certain words and terms are used herein solely for convenience and such words and terms should be broadly understood as encompassing various objects and actions that are generally understood in various forms and equivalencies by persons of ordinary skill in the art. For example, the phrase "configured to" as used herein generally indicates refers to an object having a physical structure and/or a capability to execute an action that is described in the context of the phrase. The word "adjustable" as used herein pertains to various types of actions that can be taken, in various ways, in order to execute a functionality. For example, in a first exemplary implementation, a birefringent optical element may be "adjustable" to alter a characteristic of a light beam by twirling a knob to rotate the birefringent optical element. In a second exemplary implementation, a birefringent optical element may be "adjustable" to alter a characteristic of a light beam by physically removing the birefringent optical element from a mechanical mount and placing it back upon the mechanical mount with a different orientation. The phrase "optical light propagation path" as used herein can refer to any optical transmission path through any propagation medium (air, optical fiber etc.) over which light propagates between any two end-to-end elements, including one or more intervening elements placed between the two end-to-end elements in some cases. It should also be understood that the word "example" as used herein is intended to be non-exclusionary and non-limiting in nature. More particularly, the word "exemplary" as used herein indicates one among several examples and it should be understood that no special emphasis, exclusivity, or preference, is associated or implied, by the use of this word.

Generally, in accordance with the various illustrative embodiments disclosed herein, a heterodyne optical interferometer incorporates one or more error correction elements to correct a cyclic error in a composite light beam having two different wavelength components orthogonally polarized with respect to each other. The cyclic error, which can be alternatively referred to as a periodic error in some applications, is caused by various factors such as an imperfect polarization relationship between two wavelength components, deficiencies in optical propagation paths (such as light leakage), and/or structural deficiencies in optical components.

The cyclic error typically manifests itself as erroneous displacement information having a low frequency sinusoidal characteristic when a target object moves at a slow rate and can be remedied in accordance with the disclosure by using birefringent optical elements and other optical elements that alter certain characteristics of one or both wavelength components. Some of the optical elements can also be used for optical filtering of the wavelength components and light leakage components in order to reduce or eliminate the cyclic error. These aspects will be described below in more detail using the various figures.

FIG. 1 shows an exemplary embodiment of a heterodyne optical interferometer 100 incorporating cyclic error correcting elements. In this exemplary embodiment, a laser 105 produces a pair of coherent light beams. A first light beam of the pair of coherent light beams has a first wavelength and a first polarization. A second light beam of the pair of coherent light beams has a second wavelength that is slightly different than the first wavelength and has a second polarization that is different than the first polarization. Typically, the second polarization is orthogonal to the first polarization. In this exemplary embodiment, the first light beam is conveyed to a lens 103 by using a first optical fiber 101. The second light beam is similarly conveyed to the lens 103 by using a second optical fiber 102.

The lens 103 focuses the first light beam and the second light beam upon a diattenuator 115, which is a polarization sensitive optical element that is disposed into a light propagation path of the two light beams and used to attenuate one light beam with respect to the other light beam. In some traditional applications, the diattenuator 115 may be adjusted to obtain optical power balance between the first light beam and the second light beam. However, in accordance with an exemplary embodiment of the invention, the diattenuator 115 may be further used (independently, or in cooperation with other optical elements of the heterodyne optical interferometer 100) to reduce light leakage components in the heterodyne optical interferometer 100. The general purpose behind reducing the light leakage components in the heterodyne optical interferometer 100 is to eliminate, or to at least minimize, a cyclic error that may be present in an interferometric measurement executed by the heterodyne optical interferometer 100.

It may be pertinent to point out that in accordance with various embodiments of the disclosure, eliminating or minimizing the cyclic error does not necessarily involve optimizing an amount of optical power present in a measurement beam (or other light beams) of a heterodyne optical interferometer. In at least some cases, a reduction in cyclic error may be obtained by attenuating an amount of optical power and/or by providing an optical power imbalance between the first light beam and the second light beam so as to, for example, reduce a light leakage component contributed by one light beam that is greater than a light leakage component contributed by the other light beam.

The first and second light beams are propagated through the diattenuator 115 and to a combiner 120, which combines the two light beams to form a composite light beam. Thus, the composite light beam includes a first wavelength component having a first polarization and a second wavelength component having a second polarization.

In accordance with an exemplary embodiment of the invention, the combiner 120 is an adjustable optical element and may be adjusted independently, or in cooperation with other optical elements of the heterodyne optical interferometer 100, to alter one or more characteristics of the first wavelength component and/or the second wavelength component for reducing a cyclic error. In some cases, a reduction in cyclic error may be obtained by adjusting the combiner 120 to provide a power combination other than a fifty-fifty power combination of the two wavelength components, thereby allowing for a larger portion of one of the two wavelength components to be present in the composite light beam that is propagated out of the combiner 120.

The composite light beam that is propagated out of the combiner 120 is received by a non-polarizing optical beam splitter 125 that redirects a first portion of the composite light beam in an orthogonal direction towards a birefringent optical element 133, and allows a second portion of the composite light beam to propagate straight through into a polarizer 145. The polarizer 145, which combines equal amounts of the orthogonal components of the composite light beam in one exemplary implementation, propagates the second portion of the composite light beam, which is henceforth referred to as a reference beam, to a measurement system 150.

In addition to receiving the reference beam, the measurement system 150 also receives a measurement beam that is propagated out of a polarizer 140 and via an optical fiber 137, in this exemplary embodiment. The polarizer 140, which is disposed into a light propagation path of a measurement beam (provided by a polarizing beam splitter 130), typically combines equal amounts of the orthogonal components of the measurement beam in a manner similar to the polarizer 145. The measurement system 150 comprises an interferometer 160, which uses the measurement beam and the reference beam to execute an interferometric measurement for detecting a Doppler shift component. Notably, the interferometer 160 is a known device, and may be one of a number of interferometers within the purview of one of ordinary skill in the art. The Doppler shift component indicates an extent of displacement and a direction of movement of a movable target reflector 135 with respect to the polarizing optical beam splitter 130. A cyclic error that may be present in the interferometric measurement is typically characterized as a low velocity component when the movable target reflector 135 has a slow displacement characteristic. The low velocity component may range from about 0.1 nm to about 5 nm in some exemplary applications.

As described above, the non-polarizing optical beam splitter 125 redirects a first portion of the composite light beam in an orthogonal direction towards a birefringent optical element 133. The various directions of propagation of the first wavelength component contained in the composite light beam received at the birefringent optical element 133 are indicated by black arrowheads that include numbers indicating a propagation sequence of the first wavelength component inside and outside the polarizing optical beam splitter 130. Similarly, the various directions of propagation of the second wavelength component contained in the composite light beam received at the birefringent optical element 133 are indicated by white arrowheads that include numbers indicating a propagation sequence of the second wavelength component inside and outside the polarizing optical beam splitter 130.

The first portion of the composite light beam propagating from the non-polarizing optical beam splitter 125 to the birefringent optical element 133 can be operated upon by not only the birefringent optical element 133, but by any other optical element that may be placed in the light propagation path between the non-polarizing optical beam splitter 125 and the polarizing optical beam splitter 130.

The birefringent optical element 133 can be any one of various types of optical elements that can be used for altering one or more characteristics of the first wavelength component and/or one or more characteristics of the second wavelength component contained in the composite light beam. A few exemplary optical elements that can be used to implement the birefringent optical element 133, as well as various other optical elements that are generally referred to herein as light attenuating elements, include a diattenuator, a Faraday rotator, a waveplate, an optical filter, and a compound birefringent optical element. The optical filter, which can be a neutral density optical filter in some implementations, is used to execute an optical filtering action that modifies one or more characteristics (intensity, polarization, etc.) of a wavelength component. The compound birefringent optical element is typically an integrated assembly of at least two optical elements (such as two or more birefringent optical elements, for example). A first light attenuating element of the compound birefringent optical element may be adjustable with a first degree of resolution and a second light attenuating element may be adjustable with a second degree of resolution in some applications.

In accordance with an exemplary embodiment of the invention, the birefringent optical element 133 is adjustable and may be adjusted independently, or in cooperation with other light attenuating elements of the heterodyne optical interferometer 100, to reduce a light leakage component in one or more light propagation paths in the heterodyne optical interferometer 100 so as to eliminate/minimize a cyclic error that may be present in an interferometric measurement carried out by using the heterodyne optical interferometer 100. For example, the birefringent optical element 133 may be adjusted to alter a polarization characteristic of one or both wavelength components in the composite light beam and/or to attenuate one or both wavelength components in the composite light beam.

Furthermore, in accordance with various exemplary embodiments of the invention, the various light attenuating elements of the heterodyne optical interferometer 100 can be implemented and adjusted in various different ways. For example, in one exemplary embodiment, each of the diattenuator 115 and the combiner 120 can be placed on mechanical mounts and adjusted by using adjustment hardware such as a rotary knob, a ring, or a handle. In another exemplary embodiment, the various light attenuating elements can be adjusted electronically (such as by application of a control voltage), to alter a light propagation characteristic. In yet another exemplary embodiment, the birefringent optical element 133 can be mounted upon an external surface 126 of the polarizing optical beam splitter 130 and can be a part of an integrated assembly that includes the birefringent optical element 133, the polarizing optical beam splitter 130, and one or more other optical elements mounted upon various surfaces of the polarizing optical beam splitter 130. The one or more optical elements can include another birefringent optical element 136 that is mounted upon an external surface 127 that is orthogonal to the external surface 126.

The first portion of the composite light beam propagating from the non-polarizing optical beam splitter 125 to the birefringent optical element 133 is propagated through the birefringent optical element 133 and into the polarizing optical beam splitter 130. A polarizing beam splitting coating 132 that is a part of the polarizing optical beam splitter 130 splits the composite light beam on the basis of the orthogonal polarization of the first wavelength component with respect to the second wavelength component. More particularly, the polarizing beam splitting coating 132 is configured to direct the first wavelength component of the composite light beam along a first light propagation path 121 and the second wavelength component of the composite light beam along a second light propagation path 122 that is orthogonal to the first light propagation path 121.

As can be understood, if the polarizing beam splitting coating 132 was ideal, no portion of the second wavelength component will be present in the first light propagation path 121 and no portion of the first wavelength component will be present in the second light propagation path 122. However, in real life, the polarizing beam splitting coating 132 is non-ideal, and some light leakage will occur in the coating thus leading to a portion of the second wavelength component being present in the first light propagation path 121 (in the form of a first light leakage component) and/or a portion of the first wavelength component being present in the second light propagation path 122 (in the form of a second light leakage component). The two light leakage components can contribute to a cyclic error being present in an interferometric measurement carried out by using the heterodyne optical interferometer 100. It is therefore desirable to eliminate, or to at least attenuate, these two undesirable light leakage components that may be present in the polarizing optical beam splitter 130. It is also desirable to eliminate, or to at least attenuate, various other undesirable light leakage components that may be present elsewhere in the heterodyne optical interferometer 100, in order to reduce the cyclic error.

One exemplary light attenuating element that may be used to attenuate the first light leakage component (when present in the first light propagation path 121) is a birefringent optical element 134. Thus, in accordance with an exemplary embodiment of the invention, the birefringent optical element 134, which is located in the first light propagation path 121, is an adjustable element that is adjusted independently, or in cooperation with other light attenuating elements of the heterodyne optical interferometer 100, to attenuate the first light leakage component and/or to alter one or more characteristics of the first wavelength component so as to reduce a cyclic error present in an interferometric measurement.

The birefringent optical element 134 can be any of various optical elements used to attenuate the first light leakage component (i.e. the undesirable second wavelength component) and/or alter an amplitude of the first wavelength component, in the first light propagation path 121. A few exemplary optical elements include a waveplate, an optical filter, a diattenuator, a Faraday rotator, and a compound birefringent optical element.

The first wavelength component propagates through the birefringent optical element 134 and towards the movable target reflector 135. In this exemplary embodiment, the movable target reflector 135 includes a planar reflecting surface, and is capable of moving towards and/or away from the polarizing optical beam splitter 130. In other embodiments, the movable target reflector 135 can have a non-planar reflecting surface (such as in an angularly-oriented mirror) or can be one of various types of objects such as an object having an irregular surface, or an object having a gaseous composition.

Furthermore, in this exemplary embodiment, the movable target reflector 135 and the polarizing optical beam splitter 130 are configured to cooperate with each other in a two-pass mode of operation, wherein the polarizing optical beam splitter 130 cooperates with the movable target reflector 135 to reflect a second light beam along another light propagation path 123 that runs parallel to the first light propagation path 121. In other embodiments, the polarizing optical beam splitter 130 and the movable target reflector 135 can be configured to cooperate in a multi-pass mode of operation, such as a four-pass mode of operation involving four reflections by the movable target reflector 135.

More particularly, in the two-pass mode of operation, the movable target reflector 135 reflects the first wavelength component back through the birefringent optical element 134 and towards the polarizing beam splitting coating 132 along the first light propagation path 121 (as indicated by a black arrowhead with a number 3). The polarizing beam splitting coating 132 redirects the reflected first wavelength component orthogonally towards a corner cube reflector 131 (as indicated by a black arrowhead with a number 4). The corner cube reflector 131 redirects the first wavelength component along a light propagation path 124 that runs parallel to the light propagation path 122 (as indicated by a black arrowhead with a number 5), and towards the polarizing beam splitting coating 132. The polarizing beam splitting coating 132 then redirects the first wavelength component orthogonally along the light propagation path 123 that runs parallel to the light propagation path 121 (as indicated by a black arrowhead with a number 6) towards the movable target reflector 135.

The movable target reflector 135 reflects the first wavelength component back along the light propagation path 123 towards the polarizing beam splitting coating 132 (as indicated by a black arrowhead with a number 7). The polarizing beam splitting coating 132 allows the first wavelength component (which has undergone polarization changes in traversing back and forth through the birefringent optical element 134 and the reflection by the movable target reflector 135), to pass through, and out of, the polarizing optical beam splitter 130 (as indicated by a black arrowhead with a number 8). This output light beam is one of two constituent parts of the measurement beam that is provided to the measurement system 150.

Another constituent part of the measurement beam is the second wavelength component that is propagated through the polarizing optical beam splitter 130 along various light propagation paths after being initially directed by the polarizing beam splitting coating 132 along the second light propagation path 122 that is orthogonal to the first light propagation path 121. More particularly, the second wavelength component propagates along the second light propagation path 122 (as indicated by a white arrowhead with a number 2) towards the second birefringent optical element 136. Some light leakage can occur in the polarizing beam splitting coating 132 thereby leading to a second light leakage component being present in the second light propagation path 122 in the form of a small portion of the first wavelength component. The second light leakage component present in the second light propagation path 122 may or may not be equal in amplitude to the first light leakage component present in the first light propagation path 121. Consequently, an amount of attenuation applied via the second birefringent optical element 136 to the second light leakage component present in the second light propagation path 122 may be different than the amount of attenuation applied via the first birefringent optical element 134 to the first light leakage component present in the first light propagation path 121.

In accordance with an exemplary embodiment of the invention, the second birefringent optical element 136 is an adjustable element that is adjusted independently, or in cooperation with other light adjusting elements of the heterodyne optical interferometer 100 (such as the first birefringent optical element 134), to attenuate the second light leakage component that may be present in the second light propagation path 122 and/or to alter one or more characteristics of the second wavelength component present in the second light propagation path 122 so as to reduce a cyclic error present in an interferometric measurement.

The one or more characteristics of the second wavelength component that can be altered by using the second birefringent optical element 136 include an intensity and/or a polarization of the second wavelength component. The birefringent optical element 136 can be any of various optical elements such as a waveplate, an optical filter, a diattenuator, a Faraday rotator, and a compound birefringent optical element.

In this exemplary embodiment, the second birefringent optical element 136, is adjusted to reflect, wholly or partially, the second wavelength component back along the light propagation path 122 (as indicated by a white arrowhead with a number 3) towards the polarizing beam splitting coating 132. The polarizing beam splitting coating 132 allows the second wavelength component to pass through to the corner cube reflector 131, which redirects the second wavelength component along the light propagation path 124 that runs parallel to the light propagation path 122 (as indicated by a white arrowhead with a number 4) and towards the polarizing beam splitting coating 132. The polarizing beam splitting coating 132 allows the second wavelength component to pass through to the second birefringent optical element 136, which reflects, wholly or partially, the second wavelength component back along the light propagation path 124 (as indicated by a white arrowhead with a number 5) towards the polarizing beam splitting coating 132. The polarizing beam splitting coating 132 then redirects the second wavelength component orthogonally out of the polarizing optical beam splitter 130 (as indicated by a white arrowhead with a number 6). The second wavelength component thus becomes a second constituent part of the measurement beam (together with the first wavelength component) that is provided to the measurement system 150.

The measurement beam propagated out of the polarizing optical beam splitter 130 is coupled into the polarizer 140. In accordance with an exemplary embodiment of the invention, the polarizer 140 not only combines equal amounts of the orthogonal components present in the measurement beam but is also an adjustable element that is adjusted independently, or in cooperation with other light attenuating elements of the heterodyne optical interferometer 100 (such as the first birefringent optical element 134 and the second birefringent optical element 136), to alter one or more characteristics of the first wavelength component and/or the second wavelength component present in the measurement beam, for reducing a cyclic error that may be present in the interferometric measurement.

In some implementations in accordance with the disclosure, one or more additional optical elements can be disposed between the polarizing optical beam splitter 130 and the polarizer 140. The additional optical elements, such as a birefringent optical element or a diattenuator, is shown in the form of a dashed line box 155, and can be adjustable independently, or in cooperation with other light attenuating elements of the heterodyne optical interferometer 100, to alter a polarization characteristic of one or both wavelength components and/or to attenuate one or both wavelength components.

Adjusting the various adjustable optical elements of the heterodyne optical interferometer 100 in a cooperative manner as described above, provides a certain amount of flexibility to address various light leakage components that may be present at various locations in the heterodyne optical interferometer 100. For example, in a first exemplary implementation, a leakage light component present in the composite light beam entering the birefringent optical element 133 may be negligible or at an acceptable level, whereas a leakage light component present in the first light propagation path 121 may be at an unacceptable level (due to a sub-optimal polarizing beam splitting coating 132, for example). In this situation, a technician may opt to adjust birefringent optical element 134 and not carry out any adjustment on the birefringent optical element 133.

In a second exemplary implementation, a leakage light component present in the first light propagation path 121 may be at an acceptable level, whereas a leakage light component in present in the second light propagation path 122 may be at an unacceptable level (due to a misalignment of the second birefringent optical element 136, for example). In this situation, the technician may opt to adjust birefringent optical element 134 and not carry out any adjustment on the birefringent optical element 133 and the birefringent optical element 136.

In a third exemplary implementation, a leakage light component present in each of the first light propagation path 121 and the second light propagation path may be at an unacceptable level (due to a sub-optimal polarizing beam splitting coating 132, for example). In this situation, the technician may opt to adjust birefringent optical element 134, birefringent optical element 136, and/or the polarizer 140.

The various implementations thus allow for adjustment operations to be carried out using cyclic error correction elements in the hardware domain rather than in the traditional software domain (signal averaging, digital filtering etc.) thereby providing a relatively quick way to address cyclic errors that may be present in an interferometric measurement.

Figure 2:
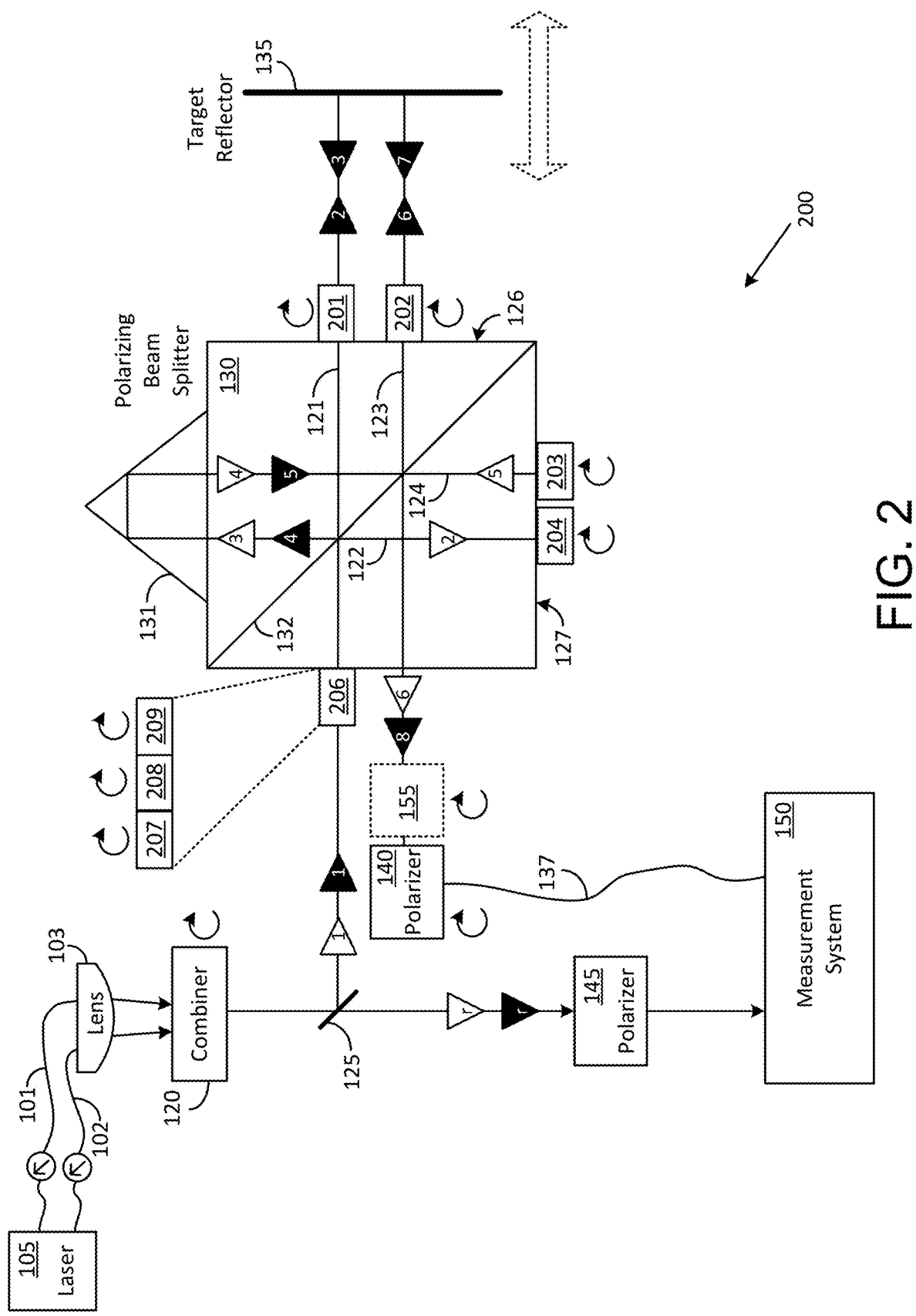
FIG. 2 shows another exemplary embodiment of a heterodyne optical interferometer incorporating cyclic error correcting elements in accordance with the disclosure.

FIG. 2 shows another exemplary embodiment of a heterodyne optical interferometer 200 incorporating cyclic error correcting elements. The heterodyne optical interferometer 200 includes a few elements that are different from corresponding elements in the heterodyne optical interferometer 100 shown in FIG. 1. More particularly, the diattenuator 115 shown in FIG. 1 is eliminated and each of the birefringent optical element 134 and the birefringent optical element 136 that is used in the heterodyne optical interferometer 100 is replaced by a pair of birefringent optical elements.

In this exemplary embodiment, cyclic error correction operations that may be carried out by using the diattenuator 115 shown in FIG. 1, can now be carried out by a compound birefringent optical element 206. In one exemplary implementation, the compound birefringent optical element 206 includes a diattenuator 208 arranged between a first birefringent optical element 207 and a second birefringent optical element 209. The diattenuator 208, the first birefringent optical element 207, and/or the second birefringent optical element 209 can be utilized for modifying an amplitude of the first wavelength component and/or the second wavelength component of the composite light beam propagating along the light propagation path between the combiner 120 and the polarizing optical beam splitter 130 (via the non-polarizing optical beam splitter 125).

In this exemplary implementation, the compound birefringent optical element 206 is located between the non-polarizing optical beam splitter 125 and the polarizing optical beam splitter 130 in a first light propagation path segment between the laser 105 and the polarizing optical beam splitter 130. However, in another exemplary implementation, the compound birefringent optical element 206 may be located between the combiner 120 and the non-polarizing optical beam splitter 125, in a second light propagation path segment between the laser 105 and the polarizing optical beam splitter 130.

As indicated above, each of the birefringent optical element 134 and the birefringent optical element 136 that is used in the heterodyne optical interferometer 100 is replaced by a pair of birefringent optical elements. More particularly, birefringent optical element 204 can be adjusted to reflect, wholly or partially, the second wavelength component back along the light propagation path 122 (as indicated by the white arrowhead with a number 3) towards the polarizing beam splitting coating 132. The polarizing beam splitting coating 132 allows the second wavelength component to pass through to the corner cube reflector 131, which redirects the second wavelength component along the light propagation path 124 that runs parallel to the light propagation path 122 (as indicated by the white arrowhead with a number 4) and towards the polarizing beam splitting coating 132. The polarizing beam splitting coating 132 allows the second wavelength component to pass through to the second birefringent optical element 203, which can be adjusted to reflect, wholly or partially, the second wavelength component back along the light propagation path 124 (as indicated by a white arrowhead with a number 5) towards the polarizing beam splitting coating 132. The polarizing beam splitting coating 132 redirects the second wavelength component orthogonally out of the polarizing optical beam splitter 130 (as indicated by a white arrowhead with the number 6).

Utilizing the birefringent optical element 203 and the birefringent optical element 204 in place of the birefringent optical element 136 that is utilized in the heterodyne optical interferometer 100, allows independent adjustments to be carried out upon the second wavelength component that is propagating over two parallel light propagation paths (light propagation path 122 and light propagation path 124). Consequently, a first light leakage component that may be present in light propagation path 122 can be addressed by the birefringent optical element 204 and a second light leakage component that may be present in the light propagation path 124 can be independently addressed by the birefringent optical element 203. The second light leakage component may have a different amplitude than the first light leakage component as a result of dissimilarities in the coatings on opposing surfaces of the polarizing beam splitting coating 132 for example.

The birefringent optical element 201 and the birefringent optical element 202 can be similarly used as individual light attenuating elements that allow for independent adjustments to be carried out upon the first wavelength component that is propagating over two parallel light propagation paths (light propagation path 121 and light propagation path 123). A first light leakage component that may be present in the light propagation path 121 can be reduced by utilizing the birefringent optical element 201 and a second light leakage component that may be present in the light propagation path 123 can be independently reduced by utilizing the birefringent optical element 202. The second light leakage component may have a different amplitude than the first light leakage component as a result of dissimilarities in the coatings on opposing surfaces of the polarizing beam splitting coating 132 for example.

Figure 3:
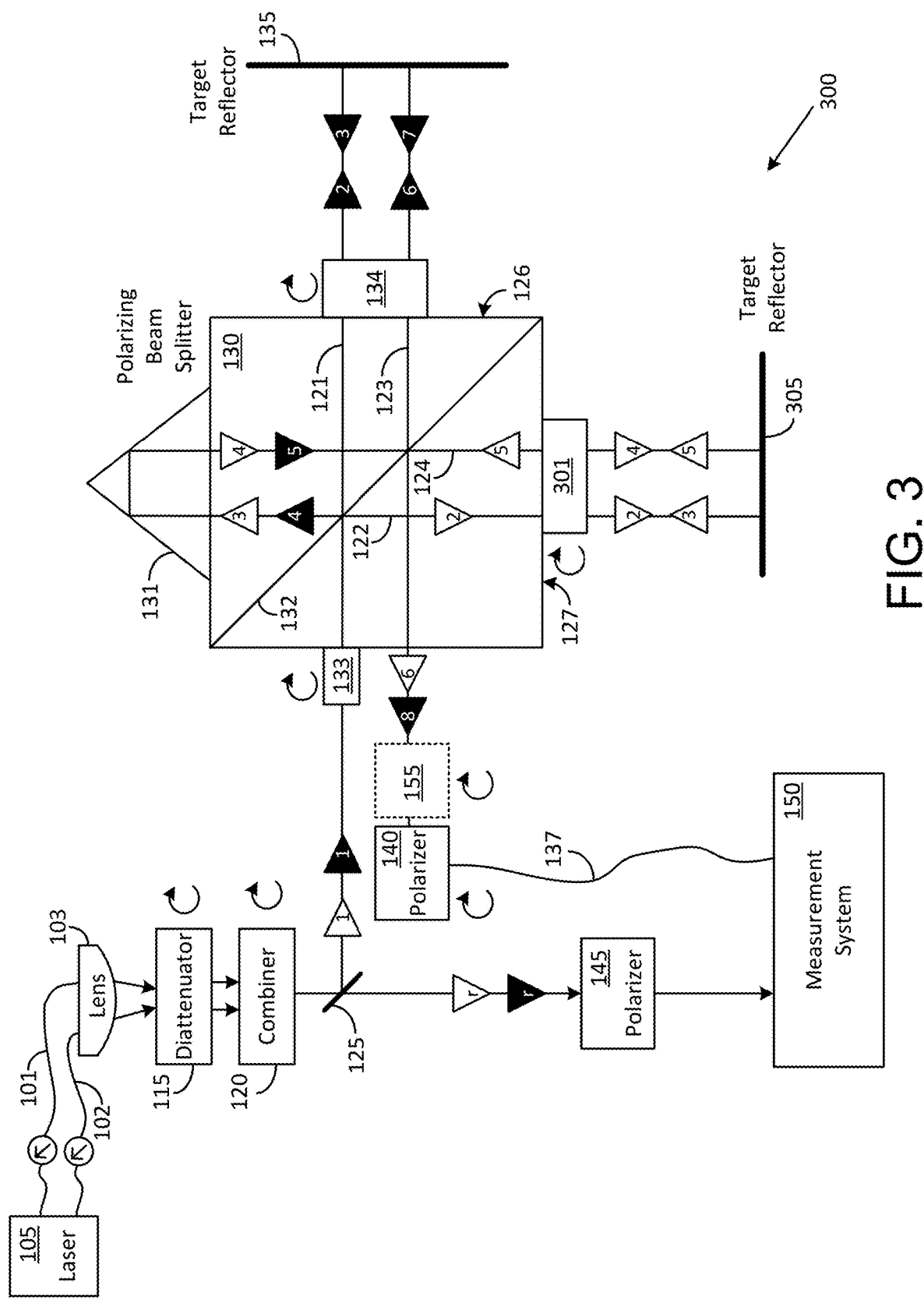
FIG. 3 shows yet another exemplary embodiment of a heterodyne optical interferometer incorporating cyclic error correcting elements in accordance with the disclosure.

FIG. 3 shows another exemplary embodiment of a heterodyne optical interferometer 300 incorporating cyclic error correcting elements. The heterodyne optical interferometer 300 includes a few elements that are different from corresponding elements in the heterodyne optical interferometer 100 shown in FIG. 1. More particularly, the birefringent optical element 136 that is used in the heterodyne optical interferometer 100 is replaced by a birefringent optical element 301. In contrast to the birefringent optical element 136 that can be adjusted to reflect, wholly or partially, the second wavelength component propagating along the light propagation path 122 and the light propagation path 124, the birefringent optical element 301 allows the second wavelength component propagating along the light propagation path 122 to pass through to a target reflector 305 and also allows the second wavelength component propagating along the light propagation path 124 (after reflection by the target reflector 305) to pass through to the polarizing beam splitting coating 132. Any light leakage component present in the second wavelength component in either light propagation path can be addressed by adjusting a transmittivity characteristic of the birefringent optical element 301. A few exemplary optical elements that can be used for the birefringent optical element 301 include a waveplate, an optical filter, a diattenuator, a Faraday rotator, and a compound optical element.

The heterodyne optical interferometer 300 accommodates various types of differential displacement measurements that can be carried out by utilizing the target reflector 305 (which can either be a static object or a movable object in various applications) and the movable target reflector 135 in cooperation with each other. One or both of the target reflector 305 and the movable target reflector 135 can be configured to move when carrying out measurements to determine a differential displacement measurement between the target reflector 305 and the movable target reflector 135 with respect to the polarizing optical beam splitter 130 and/or a relative displacement measurement between the target reflector 305 and the movable target reflector 135 with respect to the polarizing optical beam splitter 130.

Figure 4:
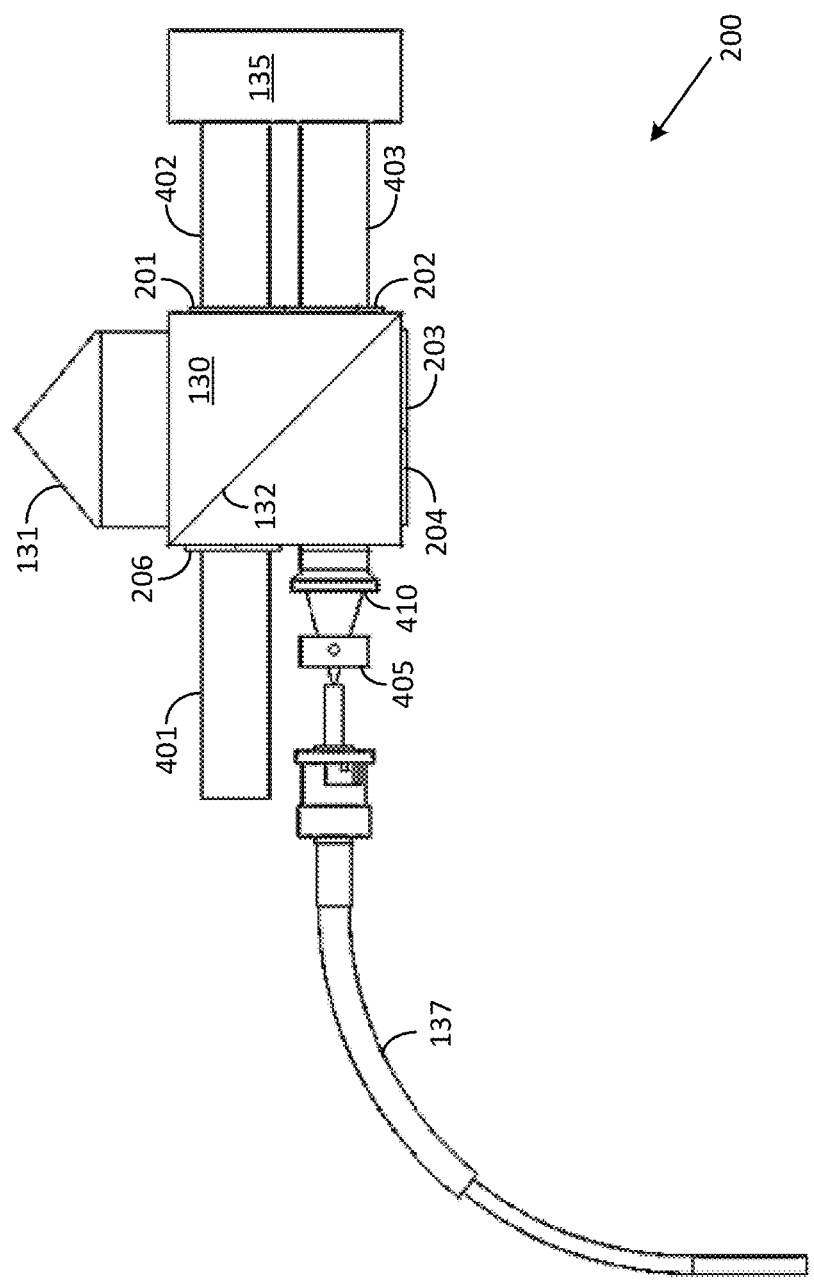
FIG. 4 shows a top view of an exemplary implementation of the heterodyne optical interferometer shown in FIG. 2.

FIG. 4 shows a first isometric view of the exemplary heterodyne optical interferometer 200 that is illustrated in FIG. 2. Like numerals indicate like structural elements and features in FIGS. 2 and 4. Additionally, numeral 401 indicates the composite light beam, which includes the first wavelength component and the second wavelength component, entering the polarizing optical beam splitter 130 via the birefringent optical element 133. Numeral 402 indicates the first wavelength component propagated through the birefringent optical element 201 towards the movable target reflector 135 and reflected by the movable target reflector 135 back towards the polarizing beam splitting coating 132 over the first light propagation path 121. Numeral 403 indicates the first wavelength component propagated through the birefringent optical element 202 towards the movable target reflector 135 over the light propagation path 123 that runs parallel to the first light propagation path 121 and reflected by the movable target reflector 135 back towards the polarizing beam splitting coating 132 over the light propagation path 123.

In one or more exemplary embodiments, the birefringent optical element 202 and the birefringent optical element 201 can be packaged in the form of an integrated assembly. The birefringent optical element 203 and the birefringent optical element 204 can be similarly packaged in the form of another integrated assembly.

A housing 405 that is attached to an output coupler 410 of the polarizing optical beam splitter 130, encloses the polarizer 140 (not shown) and any additional optical elements (such as a birefringent optical element or a diattenuator) that are shown in the form of a dashed line box 155 in FIG. 1. In one exemplary implementation, the housing 405 is a rotatable housing, which can be rotated, for example, to alter one or more characteristics of the first wavelength component and/or the second wavelength component present in the measurement beam. Various fixtures such as a lever, a handle, or a knurled ring, can be included in the housing 405 for rotating the housing 405.

Figure 5:
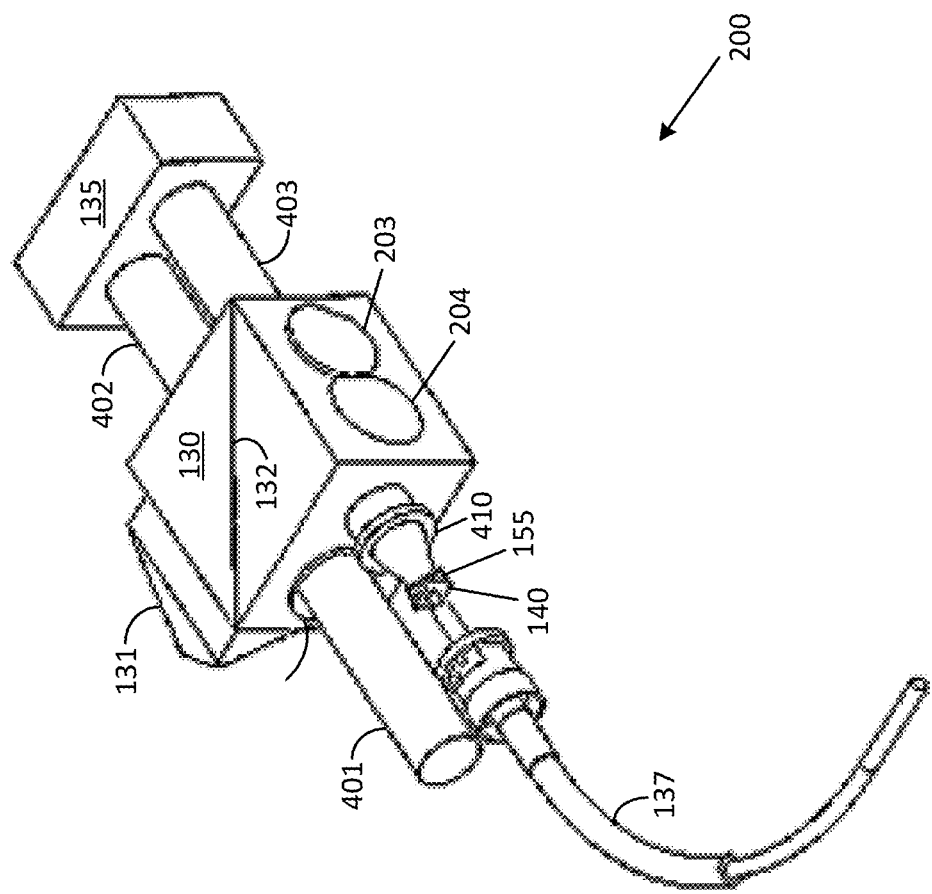
FIG. 5 shows a first isometric view of the heterodyne optical interferometer shown in FIG. 4.

FIG. 5 shows the exemplary heterodyne optical interferometer 200 (shown in FIG. 4) with the housing 405 removed. In this exemplary implementation, the polarizer 140 and the additional optical element (such as a birefringent optical element or a diattenuator that is shown in the form of a dashed line box 155 in FIG. 1) are mounted on a conical portion of the output coupler 410. Each of the polarizer 140 and the additional optical element is independently adjustable, such as by rotation with respect to the conical portion.

Figure 6:
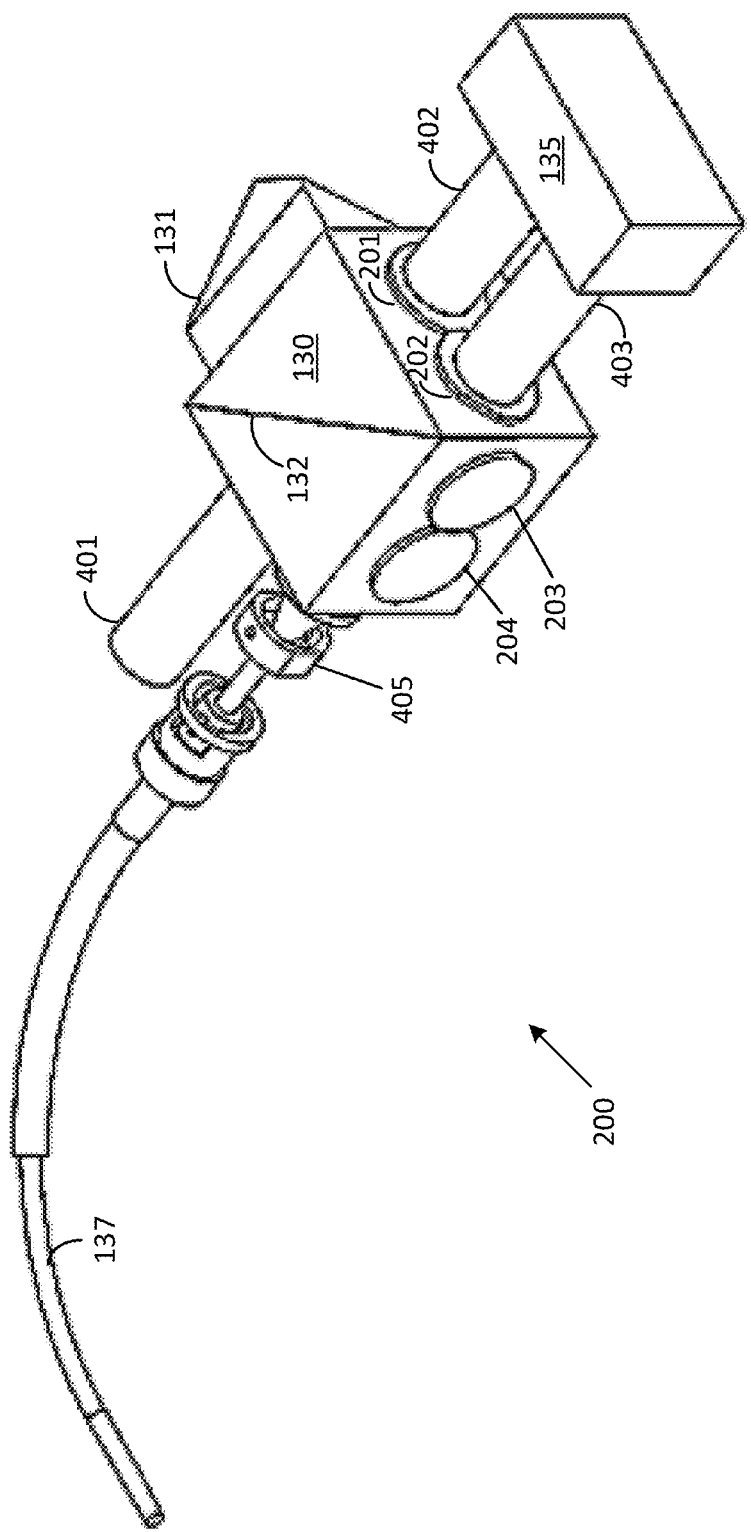
FIG. 6 shows a second isometric view of the heterodyne optical interferometer shown in FIG. 4.

FIG. 6 shows an alternative isometric view of the exemplary heterodyne optical interferometer 200 that is illustrated in FIG. 4.

Figure 7:
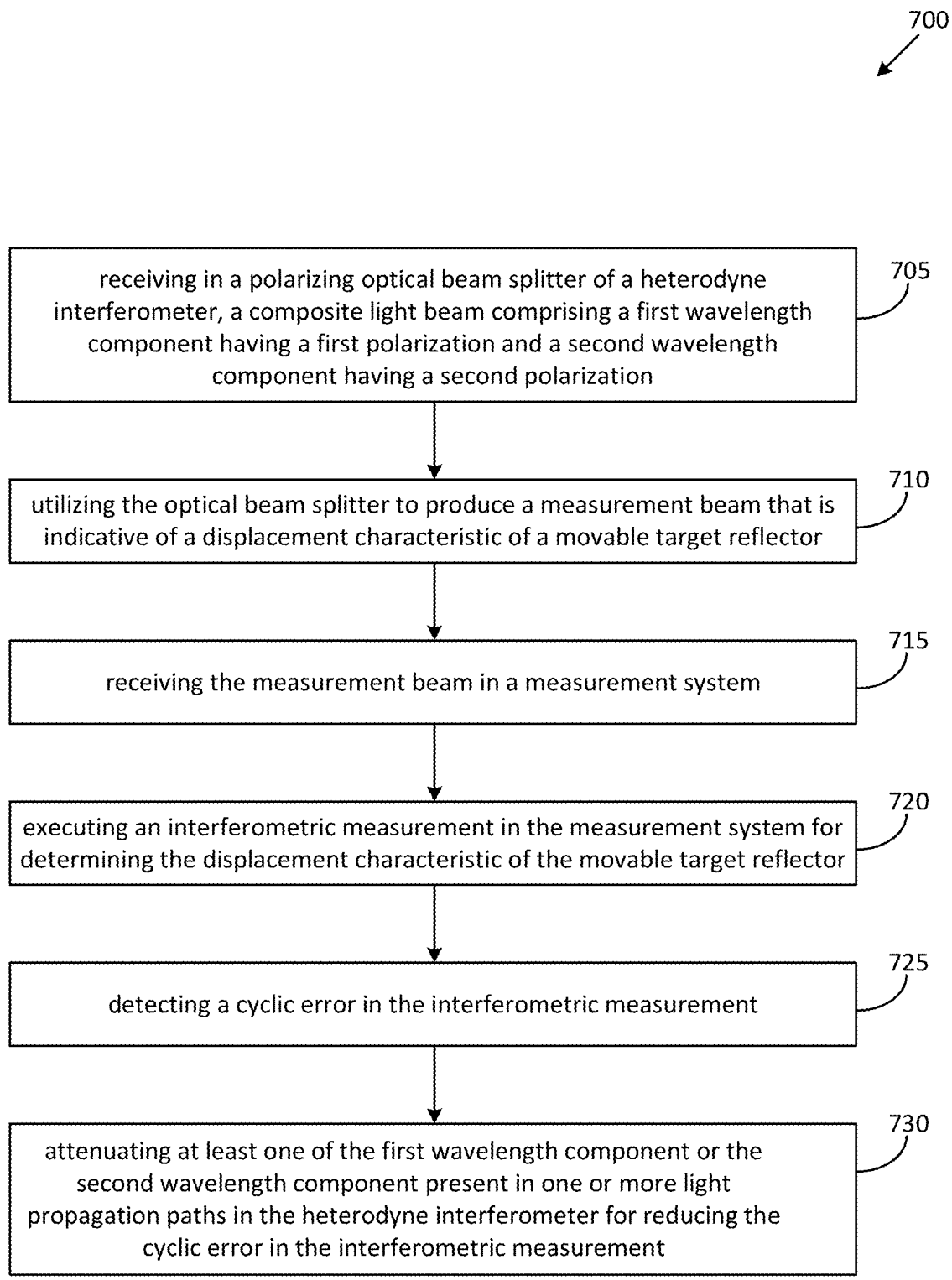
FIG. 7 shows a first flowchart depicting an exemplary method for cyclic error correction in a heterodyne optical interferometer in accordance with an embodiment of the disclosure.

FIG. 7 shows a first flowchart 700 depicting an exemplary method for cyclic error correction in a heterodyne optical interferometer in accordance with an embodiment of the disclosure. Block 705 indicates receiving in a polarizing optical beam splitter of a heterodyne interferometer, a composite light beam comprising a first wavelength component having a first polarization and a second wavelength component having a second polarization. One example of the action indicated in block 705 is the polarizing optical beam splitter 130 receiving the composite light beam from the non-polarizing optical beam splitter 125 as shown in FIG. 1. Another example of the action indicated in block 705 is the polarizing optical beam splitter 130 receiving the composite light beam indicated by numeral 401, as shown in FIG. 4.

Block 710 indicates utilizing the polarizing optical beam splitter to produce a measurement beam that is indicative of a displacement characteristic of a movable target reflector. One example of the action indicated in block 710 is utilizing the polarizing beam splitting coating 132 of the polarizing optical beam splitter 130 to cooperate with the movable target reflector 135 for producing a measurement beam that is propagated out of the polarizing optical beam splitter 130 as shown in FIG. 1.

Block 715 indicates receiving the measurement beam in a measurement system. One example of the action indicated in block 710 is shown in FIG. 1 in the form of the measurement beam being received in the measurement system 150.

Block 720 indicates executing an interferometric measurement in the measurement system for determining the displacement characteristic of the movable target reflector. One example of the action indicated in block 720 is an interferometric measurement that is carried out in the measurement system 150 for determining the displacement characteristic of the movable target reflector 135.

Block 725 indicates detecting a cyclic error in the interferometric measurement. One example of the action indicated in block 725 is a cyclic error that may be detected in the interferometric measurement carried out in the measurement system 150. As described above, the cyclic error is typically characterized as a low velocity component that is present in this interferometric measurement when the movable target reflector 135 has a slow displacement characteristic.

Block 730 indicates attenuating at least one of the first wavelength component or the second wavelength component present in one or more light propagation paths in the heterodyne interferometer for reducing the cyclic error in the interferometric measurement. One example of the action indicated in block 730 is utilizing the first birefringent optical element 134 and/or the second birefringent optical element 136 to alter one or more characteristics of the first wavelength component and/or the second wavelength component for reducing the cyclic error present in the interferometric measurement. Reducing the cyclic error can also be carried out by utilizing any one or more of optical elements such as the first birefringent optical element 134, the second birefringent optical element 136, and the birefringent optical element 133 for altering a polarization of the first wavelength component and/or the second wavelength component and/or for reducing a light leakage component in the first light propagation path 121 and/or the second light propagation path 122. Altering the polarization of the first wavelength component and/or the second wavelength component can be carried out by altering a polarization relationship between the first wavelength component and the second wavelength component. A few examples of light attenuating elements that can be used for implementing block 730 include a birefringent optical element, a diattenuator, a combiner, an optical filter, an optical coating, a Faraday rotator, and a polarizer.

The flowchart 700 can further include disposing or adjusting a light attenuating element such as the diattenuator 115 or the combiner 120 for altering one or more characteristics of the first wavelength component and/or the second wavelength component in the composite light beam prior to receiving the composite light beam in the optical beam splitter 130.

The flowchart 700 can also include utilizing the polarizer 140 and/or an additional optical element as illustrated by the dashed line box 155 (a diattenuator, a Faraday rotator, or a birefringent optical element, for example) to receive a measurement beam from the polarizing optical beam splitter 130 and alter one or more characteristics of the measurement beam for reducing the cyclic error present in the interferometric measurement.

Figure 8:
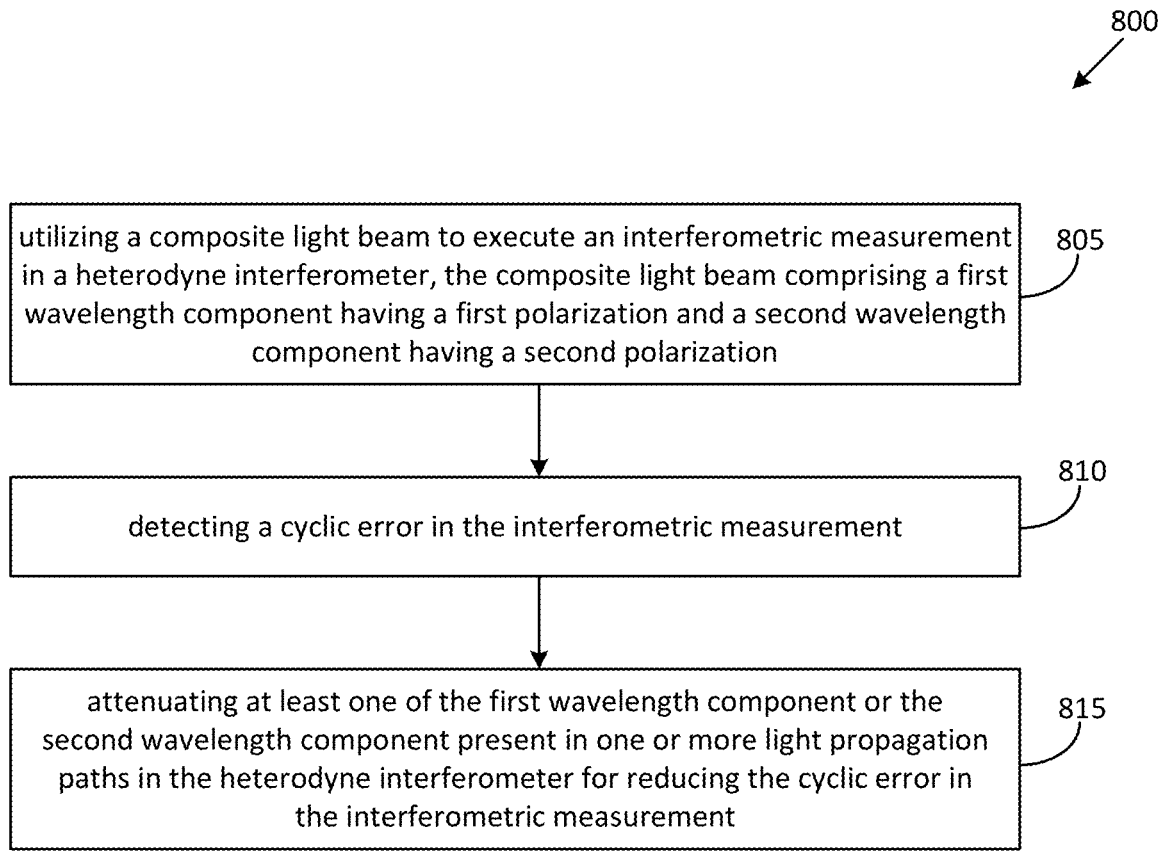
FIG. 8 shows a second flowchart depicting another exemplary method for cyclic error correction in a heterodyne optical interferometer in accordance with an embodiment of the disclosure.

FIG. 8 shows a second flowchart 800 depicting another exemplary method for cyclic error correction in a heterodyne optical interferometer in accordance with an embodiment of the disclosure. Block 805 indicates utilizing a composite light beam to execute an interferometric measurement in a heterodyne interferometer, the composite light beam comprising a first wavelength component having a first polarization and a second wavelength component having a second polarization. One example of the action indicated in block 805 can be carried out by using the heterodyne optical interferometer 100 shown in FIG. 1 to execute an interferometric measurement. A composite light beam is utilized to execute the interferometric measurement that is directed at determining a displacement characteristic of the movable target reflector 135. The interferometric measurement includes utilizing the polarizing optical beam splitter 130 to receive the composite light beam and direct the first wavelength component of the composite light beam along the first light propagation path 121 towards the movable target reflector 135 and direct the second wavelength component of the composite light beam along the second light propagation path 122 that is orthogonal to the first light propagation path 121.

Block 810 indicates detecting a cyclic error in the interferometric measurement. One example of the action indicated in block 810 is detecting a cyclic error in the interferometric measurement carried out in the measurement system 150. As described above, the cyclic error is typically characterized as a low velocity component that is present in this interferometric measurement when the movable target reflector 135 has a slow displacement characteristic.

Block 815 indicates attenuating at least one of the first wavelength component or the second wavelength component present in one or more light propagation paths in the heterodyne interferometer for reducing the cyclic error in the interferometric measurement. One example of the action indicated in block 815 is reducing a cyclic error present in the interferometric measurement carried out in the measurement system 150, by utilizing any of the birefringent optical element 133, the birefringent optical element 134, and/or the birefringent optical element 136 to reduce an amplitude of a first light leakage component in the first light propagation path 121 and/or of a second light leakage component in the second light propagation path 122.

The first light leakage component in the first light propagation path 121 can be a portion of the second wavelength component that is undesirably propagating over the first light propagation path 121 together with the first optical wavelength component, and the second light leakage component in the second light propagation path 122 can be a portion of the first wavelength component that is undesirably propagating over the second light propagation path 122 together with the second optical wavelength component.

Attenuating the light leakage component in the first light propagation path 121 can be carried out by attenuating the portion of the second wavelength component propagating along the first light propagation path 121, and attenuating the light leakage component in the second light propagation path 122 can be carried out by attenuating the portion of the first wavelength component propagating along the second light propagation path 122.

Furthermore, attenuating the light leakage component in the first light propagation path 121 and/or the second light propagation path 122 can be carried out by altering an intensity and/or a polarization of one or both of the first wavelength component and the second wavelength component present in the first light propagation path 121 and/or the second light propagation path 122.

The flowchart 800 can further include utilizing at least one of the diattenuator 115 or the combiner 120 for altering one or more characteristics of the first wavelength component and/or the second wavelength component in the composite light beam prior to receiving the composite light beam in the optical beam splitter 130.

The flowchart 800 can also include utilizing the polarizer 140 and/or an additional optical element as illustrated by the dashed line box 155 (a diattenuator, a Faraday rotator, or a birefringent optical element, for example) to receive a measurement beam from the polarizing optical beam splitter 130 and alter one or more characteristics of the measurement beam for reducing the cyclic error present in the interferometric measurement.

In summary, it should be noted that the invention has been described with reference to a few illustrative embodiments for the purpose of demonstrating the principles and concepts of the invention. It will be understood by persons of skill in the art, in view of the description provided herein, that the invention is not limited to these illustrative embodiments. Persons of skill in the art will understand that many such variations can be made to the illustrative embodiments without deviating from the scope of the invention.

What is claimed is:

1. A heterodyne interferometer comprising:
a polarizing optical beam splitter configured to receive a composite light beam comprising a first wavelength component having a first polarization and a second wavelength component having a second polarization, the polarizing optical beam splitter further configured to cooperate with a movable target reflector to produce a measurement beam;
a measurement system comprising an interferometer, the measurement system being configured to receive the measurement beam and determine a displacement characteristic of the movable target reflector; and
one or more light attenuating elements comprising a compound optical element, which comprises an integrated assembly of at least two light attenuating elements, the one or more light attenuating elements being disposed in one or more light propagation paths in the heterodyne interferometer to attenuate one or more light leakage components that contribute to a cyclic error in the displacement characteristic determined by the measurement system.

2. The heterodyne interferometer of claim 1, wherein the at least two light attenuating elements comprise a first light attenuating element that is adjustable with a first degree of resolution and a second light attenuating element that is adjustable with a second degree of resolution.

3. The heterodyne interferometer of claim 1, wherein the cyclic error has a low velocity component present in an interferometric measurement executed by the measurement system for determining the displacement characteristic of the movable target reflector.

4. The heterodyne interferometer of claim 3, wherein:
the polarizing optical beam splitter comprises a polarizing beam splitting coating configured to direct the first wavelength component along a first light propagation path towards the movable target reflector and to direct the second wavelength component along a second light propagation path that is orthogonal to the first light propagation path; and
the one or more light leakage components comprise at least one of a portion of the second wavelength component propagating along the first light propagation path or a portion of the first wavelength component propagating along the second light propagation path.

5. The heterodyne interferometer of claim 1, wherein the one or more light attenuating elements comprises one or more of a birefringent optical element, a diattenuator, a combiner, an optical filter, an optical coating, a Faraday rotator, or a polarizer.

6. The heterodyne interferometer of claim 1, wherein the cyclic error has a low velocity component present in an interferometric measurement executed by the measurement system for determining the displacement characteristic of the movable target reflector.

7. The heterodyne interferometer of claim 6, wherein:
the polarizing optical beam splitter includes a polarizing beam splitting coating configured to direct the first wavelength component along a first light propagation path towards the movable target reflector and to direct the second wavelength component along a second light propagation path that is orthogonal to the first light propagation path;
the composite light beam is propagated over a third light propagation path between a laser and the polarizing optical beam splitter;
the measurement beam is propagated over a fourth light propagation path between the polarizing optical beam splitter and the measurement system; and
the one or more light attenuating elements are disposed in one or more of the first light propagation path, the second light propagation path, the third light propagation path, or the fourth light propagation path.

8. A heterodyne interferometer comprising:
a polarizing optical beam splitter configured to receive a composite light beam comprising a first wavelength component having a first polarization and a second wavelength component having a second polarization, the polarizing optical beam splitter further configured to cooperate with a movable target reflector to produce a measurement beam;
a measurement system comprising an interferometer, the measurement system being configured to receive the measurement beam and determine a displacement characteristic of the movable target reflector; and
one or more light attenuating elements comprising one or more of a birefringent optical element, a diattenuator, a combiner, an optical filter, an optical coating, a Faraday rotator, or a polarizer, the one or more light attenuating elements being disposed in one or more light propagation paths in the heterodyne interferometer to attenuate one or more light leakage components that contribute to a cyclic error in the displacement characteristic determined by the measurement system.

9. The heterodyne interferometer of claim 8, wherein the one or more light attenuating elements comprise a first light attenuating element that is adjustable with a first degree of resolution and a second light attenuating element that is adjustable with a second degree of resolution.

10. The heterodyne interferometer of claim 8, wherein the cyclic error is characterized at least in part, by a low velocity component present in an interferometric measurement executed by the measurement system for determining the displacement characteristic of the movable target reflector.

11. The heterodyne interferometer of claim 9, wherein:
the polarizing optical beam splitter comprises a polarizing beam splitting coating configured to direct the first wavelength component along a first light propagation path towards the movable target reflector and to direct the second wavelength component along a second light propagation path that is orthogonal to the first light propagation path; and
the one or more light leakage components comprise at least one of a portion of the second wavelength component propagating along the first light propagation path or a portion of the first wavelength component propagating along the second light propagation path.

12. The heterodyne interferometer of claim 9, wherein:
the polarizing optical beam splitter includes a polarizing beam splitting coating configured to direct the first wavelength component along a first light propagation path towards the movable target reflector and to direct the second wavelength component along a second light propagation path that is orthogonal to the first light propagation path;
the composite light beam is propagated over a third light propagation path between a laser and the polarizing optical beam splitter;

the measurement beam is propagated over a fourth light propagation path between the polarizing optical beam splitter and the measurement system; and the one or more light attenuating elements are disposed in one or more of the first light propagation path, the second light propagation path, the third light propagation path, or the fourth light propagation path.

13. A heterodyne interferometer comprising:

a polarizing optical beam splitter comprising polarizing optical beam splitter includes a polarizing beam splitting coating configured to direct the first wavelength component along a first light propagation path towards a movable target reflector and to direct the second wavelength component along a second light propagation path that is orthogonal to the first light propagation path, wherein the polarizing optical beams splitter is configured to: receive a composite light beam comprising a first wavelength component having a first polarization and a second wavelength component having a second polarization; and to cooperate with a movable target reflector to produce a measurement beam, wherein the composite light beam is propagated over a third light propagation path between a laser and the polarizing optical beam splitter;

a measurement system comprising an interferometer and configured to receive the measurement beam and determine a displacement characteristic of the movable target reflector, the measurement beam is propagated over a fourth light propagation path between the polarizing optical beam splitter and the measurement system; and one or more light attenuating elements disposed in one or more light propagation paths in the heterodyne interferometer to attenuate one or more light leakage components that contribute to a cyclic error in the displacement characteristic determined by the measurement system, wherein: the one or more light attenuating elements are disposed in one or more of the first light propagation path, the second light propagation path, the third light propagation path, or the fourth light propagation path; and the one or more light attenuating elements comprise a diattenuator arranged between a first birefringent optical element and a second birefringent optical element for attenuating at least one of the first wavelength component or the second wavelength component of the composite light beam propagating over the third light propagation path.

14. The heterodyne interferometer of claim 13, wherein the cyclic error has a low velocity component present in an interferometric measurement executed by the measurement system for determining the displacement characteristic of the movable target reflector.

15. The heterodyne interferometer of claim 13, wherein:

the polarizing optical beam splitter includes a polarizing beam splitting coating configured to direct the first wavelength component along a first light propagation path towards the movable target reflector and to direct the second wavelength component along a second light propagation path that is orthogonal to the first light propagation path; and the one or more light leakage components comprise at least one of a portion of the second wavelength component propagating along the first light propagation path or a portion of the first wavelength component propagating along the second light propagation path.

16. The heterodyne interferometer of claim 13, wherein the one or more light attenuating elements comprises one or more of a birefringent optical element, a diattenuator, a combiner, an optical filter, an optical coating, a Faraday rotator, or a polarizer.

17. The heterodyne interferometer of claim 13, wherein the one or more light attenuating elements comprises a compound optical element that is an integrated assembly of at least two light attenuating elements.

18. The heterodyne interferometer of claim 17, wherein the at least two light attenuating elements comprise a first light attenuating element that is adjustable with a first degree of resolution and a second light attenuating element that is adjustable with a second degree of resolution.

* * * * *